United States Patent
Chan

(10) Patent No.: US 8,902,064 B2
(45) Date of Patent: Dec. 2, 2014

(54) SECURITY SYSTEM

(75) Inventor: Wing Kee Chan, Kovdoon (HK)

(73) Assignee: Nixon Security System Limited, Kowloon (HK)

( * ) Notice: Subject to any disclaimer, the term of this patent is extended or adjusted under 35 U.S.C. 154(b) by 380 days.

(21) Appl. No.: 13/328,583

(22) Filed: Dec. 16, 2011

(65) Prior Publication Data

US 2012/0154150 A1   Jun. 21, 2012

(30) Foreign Application Priority Data

Dec. 21, 2010 (HK) .................................. 10111960

(51) Int. Cl.
| | | |
|---|---|---|
| G08B 13/00 | (2006.01) | |
| G05B 23/02 | (2006.01) | |
| G06F 15/16 | (2006.01) | |
| G06F 15/173 | (2006.01) | |
| G06F 15/177 | (2006.01) | |
| G08B 25/00 | (2006.01) | |
| G08B 25/08 | (2006.01) | |
| H04L 29/08 | (2006.01) | |

(52) U.S. Cl.
CPC .............. G08B 25/008 (2013.01); G08B 25/08 (2013.01); H04L 67/12 (2013.01)
USPC ............ 340/541; 340/3.3; 340/506; 340/517; 340/539; 340/635; 709/202; 709/213; 709/219; 709/223; 709/225

(58) Field of Classification Search
CPC .... G08B 25/008; G08B 25/08; G08B 25/007; G08B 25/009; H04L 67/12; H04L 12/2825; H04L 29/06; H04L 67/125; G01D 4/004; G05B 19/4185; G05B 19/042; G05B 19/4183; G08C 17/02; H04M 11/04; H04Q 9/00; G01V 1/364

USPC ......... 340/506, 517, 518, 519, 520, 523, 524, 340/3.7, 541, 572.1, 539, 540, 531, 539.17, 340/3.1, 521, 870.01, 870.03, 870.07, 340/870.08, 870.16, 870.17; 709/219, 223, 709/224, 202, 213, 225, 220

See application file for complete search history.

(56) References Cited

U.S. PATENT DOCUMENTS 6,347,374 B1 *  2/2002  Drake et al. .................... 726/1
6,583,724 B1 *  6/2003  Rodriguez ................. 340/573.6
(Continued)

FOREIGN PATENT DOCUMENTS

| CN | 88 1 03843 A | 11/1988 |
|---|---|---|
| CN | 1188295 A | 7/1998 |

(Continued)

*Primary Examiner* — Daniel Wu
*Assistant Examiner* — Mancil Littlejohn, Jr.
(74) *Attorney, Agent, or Firm* — Birch, Stewart, Kolasch & Birch, LLP

(57) ABSTRACT

A security system comprises a plurality of alarm points distributed at a plurality of positions in a building; signal processing module for receiving alarm signals from at least an alarm point when alarm occurs at the at least an alarm point, transmitting the alarm signals to a server; a database for storing several sets of user information, map data, several sets of alarm point information; the server for receiving user requests from a plurality of clients, responding to the user requests according to the user information, the data map and the alarm point information, and then reverting responses to clients; the clients for sending the user request to the server and receiving and output responses. The present security system is of the advantage that it could be fully computerized and could satisfy the requirements of usage at the same time at several different sites by a plurality of different users.

12 Claims, 1 Drawing Sheet

(56) References Cited

U.S. PATENT DOCUMENTS

| | | | |
|---|---|---|---|
| 7,468,661 B2* | 12/2008 | Petite et al. | 340/540 |
| 7,711,811 B1* | 5/2010 | Adams | 709/224 |
| 8,144,836 B2* | 3/2012 | Naidoo et al. | 379/37 |
| 2005/0146606 A1* | 7/2005 | Karsenty et al. | 348/143 |
| 2006/0136575 A1* | 6/2006 | Payne et al. | 709/219 |

FOREIGN PATENT DOCUMENTS

| | | |
|---|---|---|
| CN | 1339897 A | 3/2002 |
| CN | 1564216 A | 1/2005 |
| CN | 1595900 A | 3/2005 |
| CN | 101188043 A | 5/2008 |
| JP | 2000-36092 A | 2/2000 |

* cited by examiner

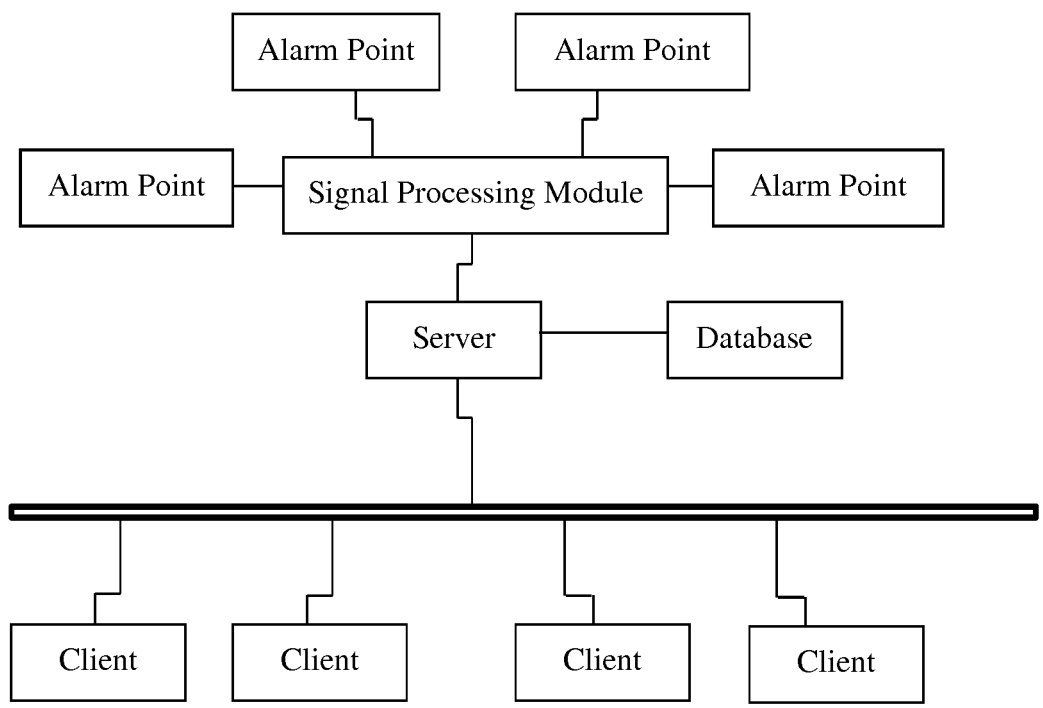

SECURITY SYSTEM

CROSS-REFERENCE TO RELATED APPLICATIONS

The application claims the priority benefits of Hong Kong Short-Term Patent Application No. 10111960.1 filed on Dec. 21, 2010, the contents of which are hereby incorporated by reference in its entirety.

FIELD OF THE INVENTION

The present invention relates to the field of building intelligent control technology, and more particularly to a security system.

BACKGROUND OF THE INVENTION

Currently, the urbanization is speeded up, and sub-districts are rapidly intellectualized and modernized. Consequently, the market prospect of development of building automation is very huge. With the development of building automation, a security system has become a very important component for building automation, which is provided within a building and comprises a plurality of alarm points for warning of theft, invasion and damage. Therefore, it is a strong deterrent to crime, and could maintain social stability.

However, the conventional security systems have not been fully computerized, and thereby could satisfy the requirement of usage at the same time at several different sites by a plurality of different users.

SUMMARY OF THE INVENTION

To overcome the above-mentioned defects of the conventional security systems, such as not being fully computerized and not being used at the same time at several different sites by a plurality of different users, the present invention aims to provide a security system which is fully computerized and could be used at the same time at several different sites by a plurality of different users.

To achieve the above object, the present invention provides a security system comprising:

a plurality of alarm points distributed at a plurality of positions in a building;

signal processing module for receiving alarm signals from at least an alarm point when alarm occurs at the at least an alarm point, and transmitting the alarm signals to a server, in which the alarm signals include identifications of alarm points;

a database for storing several sets of user information, map data, several sets of alarm point information, in which each set of alarm point information include an identification of the associated alarm point and position and equipment type of the alarm point associated with the identification;

the server for receiving user requests from a plurality of clients, responding to the user requests according to the user information, the data map and the alarm point information, and then reverting responses to the clients; and the plurality of clients for sending the user request to the server and receiving and output the responses.

In the security system of the present invention, full-duplex communication is established between the signal processing module and the server by virtue of RS485 bus, RS232 bus, or RS422 bus.

In the security system of the present invention, signals are transmitted between the server and the clients by mean of Ethernet.

In the security control system of the present invention, the alarm points are infrared sensors or fluxgate sensors.

In the security control system of the present invention, the user requests include user authentication requests, requests for operation on alarm point groups, requests for operation on alarm points without occurrence of alarm, request for operation on alarm points during occurrence of alarm, and requests for operation on reports.

In the security control system of the present invention, the user request is a user authentication request and the user authentication request include a user account and a user password, in which the server determines whether the user account and user password match the relevant user information stored in the database; if affirmative, the user authentication succeeds and the result of the authentication is returned to the client to enable the user to login; otherwise, the user authentication fails, and the result of the authentication is returned to the client to prevent the login of the user.

In the security control system of the present invention, the user request is a request for operation on alarm point groups, and the request for operation on alarm point groups includes a display mode of position pre-requisite and a display mode of equipment pre-requisite.

Where a user chooses the display mode of position pre-requisite, the sever first divides the plurality of alarm points into several first position subgroups according to positions of the alarm points, and then divides each first position subgroup into several second equipment subgroup according to equipment types of the alarm points, and finally transmits a thumbnail concerning the first position subgroups, the second equipment subgroups and positions to the relevant client; where a user chooses the display mode of equipment pre-requisite, the server first divides the plurality of alarm points into several first equipment subgroups according to equipment types of the alarm points, and then divides each first equipment subgroup into several second position subgroups according to positions of the alarm points, and finally transmits a thumbnail concerning the first equipment subgroups, the second position subgroups and equipment to the relevant client.

The clients are used to receive and display the thumbnail concerning the first position subgroups, the second position subgroups and positions, or to receive and display the thumbnail concerning the first equipment subgroups, the second position subgroups and equipment.

In the security control system of the present invention, the user request is a request for operation on alarm points without occurrence of alarm, and the request for operation on alarm points without occurrence of alarm is a request for status of alarm points or a request for displaying map of alarm points, in which the status of each of the alarm point is normal status, off-line status, or overlook status.

Where the user request is a request for status of alarm points, the server sets configurations of alarm points according status of alarm points selected by the user, and then transmits the configurations as set to the relevant client, while the client displays the configurations of alarm points as set accordingly; where the user request is a request for displaying map of alarm points, the server integrates the alarm points with the map data according to positions of the alarm points, and then transmits the integrated map data to the relevant client, while the client displays the integrated map data of alarm points.

In the security control system of the present invention, the user request is a request for operation on alarm points upon occurrence of alarm, and the request for operation on alarm points upon occurrence of alarm includes request for acknowledgement and request for reset.

When an alarm occurs at an alarm point, the server records the alarm point where the alarm occurs and the time of the alarm, and then sends a first command to the relevant client, while the relevant client emits a sound warning according to the first command, and displays the number of the alarm points where alarm occurs, the identifications of the associated alarm points and the duration of the alarm.

Where the user request is a request for acknowledgement, the server records the acknowledged alarm points and the time of acknowledgement; where the user request is a request for reset, the server records the reset alarm points and the time of reset, and then sends a second command to the relevant client, while the relevant client stops the sound warning and stops displaying the number of the alarm points where alarm occurs, the identifications of the associated alarm points and the duration of the alarm according to the second command.

In the security control system of the present invention, the user request is a record for operation on report, and the request for operation on report includes filter requirements, in which the server selects the alarm points where alarm occurs, time of the alarm, the acknowledged alarm points, the time of acknowledgement, the reset alarm points, the time of reset according the filter requirements, and generates a report for the selected results and transmits the report to the relevant client.

The security system of the present invention is of the advantage that it could be fully computerized and could satisfy the requirements of usage at the same time at several different sites by a plurality of different users.

BRIEF DESCRIPTION OF THE DRAWINGS

The present invention will be described in detail with reference to the accompanying drawing and the embodiments, in which, FIG. 1 is a block diagram of a first embodiment of a security system according to the present invention.

DETAILED DESCRIPTION OF THE INVENTION

As shown in FIG. 1 illustrating the block diagram of a first embodiment of the security system of the present invention, the security system comprises a plurality of alarm points (only 4 alarm points are shown in the FIGURE), a signal processing module, a server, a database and a plurality of clients (only 4 clients are shown in the FIGURE). The plurality of alarm points are placed at a plurality of positions in a building. The plurality of alarm points could be infrared sensors and/or fluxgate sensors, being used for warning of theft, invasion and damage. Upon occurrence of alarm at one or more alarm points, the signal processing module is used to receive alarm signals from the alarm points, and transmit the alarm signals to the server. The alarm signals include identifications of alarm points; while the database is used to store several sets of user information, map data, and several sets of alarm point information. Each set of alarm point information includes an identification of alarm point and position and equipment type of the alarm point associated with the identification. The identification of an alarm point is a set of code only associated with the corresponding alarm point. For example, if the identification of a certain alarm point is D-28F-001, the position of the alarm point is 28F-30F, and the equipment type of the alarm point is fluxgate sensor. The server is used to receive user requests from the plurality of clients, respond to the user requests according to the user information, the data map and the alarm point information, and then revert the responses to the clients. The clients are used to send user requests to the server and receive and output the responses.

Preferably, full-duplex communication is established between the signal processing module and the server by virtue of RS485 bus, RS232 bus, or RS422 bus.

Preferably, signals are transmitted between the server and the clients by mean of Ethernet.

The user requests sent from the clients to the server could include user authentication requests, requests for operation on alarm point groups, requests for operation on alarm points without occurrence of alarm, request for operation on alarm points during occurrence of alarm, and requests for operation on reports.

The signal transmission between the server and the clients would be described in detail as follows.

If the user request is a user authentication request, the user authentication request may include a user account and a user password. The server would determine whether the user account and user password match the relevant user information stored in the database. If affirmative, the user authentication succeeds, and the result of the authentication is returned to the client to enable the user to login. Otherwise, the user authentication fails, and the result of the authentication is returned to the client to prevent the login of the user.

During the course the above user authentication, human-computer interaction is performed in the following manner. First of all, the user clicks a user login selection box, and selects a user account to be used. Two kinds of user authorities could be preset, i.e. administrator and operator. The password could be input by clicking user password on a password input interface. The password input interface is consisted of a string of hexadecimal digits. For the sake of security, the places of digits shown on the interface could be different from time to time and be arranged at random. After inputting the user password, the user could click the return key. If the server approves the authentication request, login is allowed after a segment of animation for release is shown. Otherwise, a logo indicating that login is not allowed would be illustrated at the upper right corner of the dialog box, and the user is requested to input the user password once again.

If the user request is a request for operation on alarm point groups, the request for operation on alarm point groups could include a display mode of position pre-requisite and a display mode of equipment pre-requisite.

Firstly, each alarm point has its position and equipment type. Therefore, the alarm point group could be displayed in two modes, i.e. a position pre-requisite mode and an equipment pre-requisite mode. The called "position pre-requisite" means that all of the alarm points are first divided into several first position subgroups according to their positions and then each first position subgroup is divided into several second equipment subgroups according to equipment types. The called "equipment pre-requisite" means that all the alarm points are first divided into several first equipment subgroups, and then each first equipment subgroup is divided into several second position subgroups according to positions. In an example, the division according to positions could be the division according to floors or regions, such as the several position subgroups divided according to floors could be 7F (7 floor), 8F (8 floor), 9F (9 floor) etc., while the several position subgroups divided according to regions could be 20E-23F (20 floor-23 floor), 28F-30F (28 floor-30 floor), etc. The equipment subgroups divided according to equipment types could be infrared sensors, fluxgate sensors etc. in the lift well.

If a user chooses the display mode of position pre-requisite, the sever will first divide the plurality of alarm points into several first position subgroups according to positions of the alarm points, and then divide each first position subgroup into several second equipment subgroup according to equipment types of the alarm points, and finally transmit a thumbnail concerning the first position subgroups, the second equipment subgroups and positions to the relevant client. However, if a user chooses the display mode of equipment pre-requisite, the server will first divide the plurality of alarm points into several first equipment subgroups according to equipment types of the alarm points, and then divide each first equipment subgroup into several second position subgroups according to positions of the alarm points, and finally transmit a thumbnail concerning the first equipment subgroups, the second position subgroups and equipment to the relevant client.

The clients are used to receive and display the thumbnail concerning the first position subgroups, the second position subgroups and positions, or to receive and display the thumbnail concerning the first equipment subgroups, the second position subgroups and equipment.

It should be stated that regardless of the display mode, if one or more alarm points are set to be only displayed in a mode of position pre-requisite or equipment pre-requisite, those alarm points would be specially displayed in display modes of the subgroups to which they exclusively belong, in the principle that all the alarm points should be viewed by users. For example, in the display mode of equipment pre-requisite, it is possible that a subgroup is shown in the display mode of position pre-requisite.

If the user request is a request for operation on alarm points without occurrence of alarm, the request is a request for status of alarm points or a request for displaying map of alarm points. The status of an alarm point could be normal status, off-line status, or overlook status. In particular, the normal status means the alarm point functions normally, and no alarms occur; the off-line status means the alarm point could not function normally; while the overlook status means that the alarm point functions normally, while alarms will be overlooked.

If the user request is a request for status of alarm points, the server will set configurations of alarm points according status of alarm points selected by the user, and then transmit the configurations as set to the clients. The clients would display the configurations of alarm points as set accordingly. It should be stated that the present invention is not limited to the configurations of alarm points in different status. The different configurations are only used to distinguish the different statuses of alarm points.

If the user request is a request for displaying map of alarm points, the server will integrate the alarm points with the map data according to the positions of the alarm points, and then transmit the integrated map data to the clients. The clients will display the integrated map data of alarm points.

In addition, to satisfy the users' requirements for adjusting size of maps and quickly searching alarm points, the display interface could also be provided with a console for zooming in or out, a quick search key for alarm points, a full screen key for displaying maps.

If the user request is a request for operation on alarm points upon occurrence of alarm, the request could include request for acknowledgement and request for reset.

When an alarm occurs at an alarm point, the server would record the alarm point where the alarm occurs and the time of the alarm, and then send a first command to the clients. The relevant client emits a sound warning according to the first command, and displays the number of the alarm points where alarm occurs, the identifications of the associated alarm points and the duration of the alarm. If the user request is a request for acknowledgement, the server would record the acknowledged alarm points and the time of acknowledgement. If the user request is a request for reset, the server would record the reset alarm points and the time of reset, and then send a second command to the clients. The relevant client would stop the sound warning and stop displaying the number of the alarm points where alarm occurs, the identifications of the associated alarm points and the duration of the alarm according to the second command.

The human-computer interaction upon occurrence of alarm at an alarm point is described in details as follows. The relevant client emits a sound warning, and then the region of "event occurred" in the main interface becomes red and flashes, to alert the users. The first subgroup including the alarm point where alarm occurs will display a logo, which could be an exclamatory mark encompassed with a circle, and a digit could be illustrated beside the warning logo, which digit is used to indicate the number of the alarm points where alarm occurs in this subgroup. In addition, the region of "event details" in the display interface could display the identifications of the alarm points where alarm occurs and the wording "warning" and "acknowledgement". The duration of the alarm could be indicated below the wording "warning", such us 15 minutes ago (15 min ago), to indicate how long the alarm happened. If being acknowledged, the wording "acknowledgement" could be changed to the wording "reset". In addition, a button of "acknowledgement of all alarms" and a button of "reset of all alarms" could be provided to enable users to operate all the alarm points where alarm occurs at the same time. Furthermore, an administrator could set the interface to determine whether or not the functions of "acknowledgement of all alarms" and "reset of all alarms" are allowed.

The configurations of alarm points in a map under three situations are described as follows. Under normal situation, i.e. no alarm occurs, only the identification of alarm points, such as D-31F-001, are shown. Under the situation that alarm occurs but is not acknowledged, a red triangle encompassed within a red circle could be shown at an upper left corner of the relevant alarm point, which indicates that alarm occurs at this alarm point but the alarm has not been acknowledged. Under the situation that alarm occurs and has been acknowledged, a red triangle encompassed within a yellow circle could be shown at an upper left corner of the relevant alarm point, which indicates that alarm occurs at this alarm point and the alarm has been acknowledged.

In addition, the status of a main controller of the signal processing unit could be shown in the display interface of a client. If the main controller is in disorder, the client would emit sound warning malfunction of the main controller. If the main controller is in order, the identification of the main controller, the on-line or off-line status of the main controller, the on-line or off-line status of the remote receiver of the main controller could be shown.

According to the types of record, the system could set important records and records to be noted. Important records could be occurrence of alarm, off-line of system, etc. while the records to be noted could be acknowledgement of alarm points, reset of alarm points, login of users, etc. In addition, the records could be displayed in the following manners, i.e. displaying all the records, only displaying records to be noted, only displaying important records, only displaying important records and records to be noted.

If the user request is a record for operation on report, the request could include filter requirements. The server could select the alarm points where alarm occurs, time of the alarm, the acknowledged alarm points, time of acknowledgement, reset alarm points, time of reset according the filter requirements, and generate a report for the selected results and transmit the report to the relevant client. The client would output the report.

In an embodiment, the generated report could be an advanced report or a user report. The advanced report is an exclusive report interface for administrator, which could provide a plurality of detailed options and could add or delete filter requirements freely. The user report is a report format preset by the administrator for user's real-time inquiry, which could only be used as normal filter requirements. Furthermore, for the sake of security, all reports are protected by means of password. Therefore, a user should first input a password, and is able to input filter requirements only after the password is authenticated. The filter requirements of user reports could be a designated date, a designated period, a designated month, designated weeks, etc. The filter requirements of advanced reports could be the alarm points where alarm occurs, acknowledgement of alarm points, reset of alarm points, on-line of main controller, off-line of main controller, etc. For displaying the generated report, a single-page mode, a double-page mode and a scrolling-down mode could be selected.

Although the description of the present invention is made with reference to the preferred embodiments, the present invention is not limited to these embodiments. Various modifications and changes can be made to the invention by those skilled in the art without departing from the spirit and scopes of the present invention.

What is claimed is:

1. A security system comprising:
    a plurality of alarm points distributed at a plurality of positions in a building;
    signal processing module for receiving alarm signals from at least an alarm point when alarm occurs at said at least an alarm point, and transmitting said alarm signals to a server, and said alarm signals include identifications of the alarm points;
    a database for storing several sets of user information, map data, several sets of alarm point information, and each set of alarm point information includes an identification of an associated one of the alarm points and a position and a type of equipment of the associated one of the alarm points with the identification;
    the server for receiving user requests from a plurality of clients, responding to the user requests according to the user information, a data map and the alarm point information, and then reverting responses to the clients; and
    the plurality of clients for sending the user requests to the server and receiving and outputting the responses;
    wherein the user requests include user authentication requests, requests for operation of alarm point groups, requests for operation of the alarm points without an occurrence of an alarm, and requests for operation of the alarm points during the occurrence of the alarm,
    wherein requests for each of the user authentication requests, for the operation of each of alarm point groups, for each of the alarm points, for each of the occurrences of the alarm requests, and for each of the alarm points during the occurrences of the alarms, to be provided of reports; and
    wherein each of the user requests is a request for operation of one of the alarm point groups, and each of user requests for operation of the alarm point groups includes a display mode of a position pre-requisite and a display mode of an equipment pre-requisite; and
    when a user chooses the display mode of the position pre-requisite, the server first divides the plurality of the alarm points into several first position subgroups according to the positions of the alarm points, and then divides each of the first position subgroup into several second equipment subgroups according to the types of the equipment of the alarm points, and finally transmits a thumbnail concerning the first position subgroups, the second equipment subgroups, and the positions, to each of the clients that is relevant; and
    when the user chooses the display mode of the equipment pre-requisite, the server first divides the plurality of the alarm points into several of the first equipment subgroups according to the types of the equipment of the alarm points and then divides each of the first equipment subgroups into the several second position subgroups according to the positions of the alarm points, and finally transmits the thumbnail concerning the first equipment subgroups, the second position subgroups, and the types of the equipment, to the relevant clients; and
    the clients are used to receive and to display the thumbnail concerning the first position subgroups, the second position subgroups, and the positions, or to receive and to display the thumbnail concerning the first equipment subgroups, the second position subgroups, and the types of the equipment.

2. The security system according to claim 1, wherein full-duplex communication is established between the signal processing module and the server by virtue of an RS485 bus, an RS232 bus, or an RS422 bus.

3. The security system according to claim 1, wherein signals are transmitted between the server and the clients by mean of an Ethernet.

4. The security control system according to claim 1, wherein the alarm points are fluxgate sensors.

5. The security system according to claim 1, wherein each of the user requests is one of the user authentication requests, and
    each of the user authentication requests includes:
    a user account and a user password, and the server determines whether the user account and user password match relevant user information stored in the database; and
    if affirmative, the user authentication succeeds and the result of the authentication is returned to the client to enable the user to login;
    otherwise, the user authentication fails, and the result of the authentication is returned to the client to prevent the login of the user.

6. The security system according claim 1, wherein each of the user requests is one of the requests for operation of the alarm points without the occurrence of the alarm, and
    the request for operation of the alarm points without the occurrence of the alarm is a request for a status of the alarm points or a request for displaying a map of the alarm points, in and the status of each of the alarm point is a normal status, an off-line status, or an overlook status; and
    when each of the user requests is the request for the status of the alarm points, the server sets configurations of the alarm points according the status of the alarm points selected by the user, and then transmits the configurations as set to the relevant clients, while the client displays the configurations of the alarm points as set accordingly; and when each of the user requests is the request for displaying the map of the alarm points, the server integrates the alarm points with map data according to the positions of the alarm points, and then transmits integrated map data to the relevant clients, while each of the clients displays the integrated map data of the alarm points.

7. The security system according to claim 6, wherein each of the user requests is one of the requests for operation of the alarm points upon the occurrence of the alarm, and the one of the requests for operation of the alarm points upon the occurrence of the alarm includes a request for acknowledgement and a request for a reset; and when an alarm occurs at a specific one of the alarm points, the server records the specific alarm point where the alarm occurs, and a time of the alarm, and then sends a first command to the relevant clients, while each of the relevant clients emits a sound warning according to the first command, and displays a number of the alarm points where alarm occurs, identifications of associated ones of the alarm points and the duration of the alarm; and when each of the user requests is the request for acknowledgement, the server records the acknowledged alarm points, and a time of acknowledgement; and when each of the user requests is the request for the reset, the server records the reset alarm points, and a time of the reset, and then sends a second command to the relevant clients, while each of the relevant clients stops the sound warning and stops displaying the number of the alarm points where the alarm occurs, the identifications of the associated ones of the alarm points, and the duration of the alarm according to the second command.

8. The security system according to claim 7, wherein each of the user requests is a record for operation on a report, and one of the requests for operation on the report includes filter requirements, and the server selects the alarm points where the alarm occurs, the time of the alarm, the acknowledged alarm points, the time of acknowledgement, the reset alarm points, the time of the reset according the filter requirements, and generates a second report for selected results, and transmits the second report to each of the relevant clients.

9. The security system according to claim 2, wherein each of the user authentication requests and each of the user authentication requests includes a user account and a user password, and the server determines whether the user account and user password match relevant user information stored in the database; and if affirmative, the user authentication succeeds and the result of the authentication is returned to the client to enable the user to login;

otherwise, the user authentication fails, and the result of the authentication is returned to the client to prevent the login of the user.

10. The security system according to claim 2, wherein each of the user requests is one of the requests for operation of the alarm points without the occurrence of the alarm, and the one of the requests for operation of the alarm points without the occurrence of the alarm is a request for a status of the alarm points or a request for displaying a map of the alarm points, and the status of each of the alarm point is a normal status, an off-line status, or an overlook status; and when each of the user requests is the request for the status of the alarm points, the server sets configurations of the alarm points according the status of the alarm points selected by the user, and then transmits the configurations as set to each of the relevant clients, while each of the client displays the configurations of the alarm points as set accordingly; and when each of the user requests is the request for displaying the map of the alarm points, the server integrates the alarm points with map data according to the positions of the alarm points, and then transmits integrated map data to the relevant clients, while each of the clients displays the integrated map data of the alarm points.

11. The security system according to claim 10, wherein each of the user requests is the one of the requests for operation of the alarm points upon the occurrence of the alarm, and the one of the requests for operation of the alarm points upon the occurrence of the alarm includes a request for acknowledgement and a request for reset; and when an alarm occurs at a specific one of the alarm points, server records the specific alarm point where the alarm occurs, and a time of the alarm, and then sends a first command to the relevant clients, while each of the relevant clients emits a sound warning according to the first command, and displays a number of the alarm points where alarm occurs, identifications of associated ones of the alarm points, and the duration of the alarm; and when each of the user requests is the request for acknowledgement, the server records the acknowledged alarm points, and a time of acknowledgement; and when each of the user requests is a request for the reset, the server records reset alarm points, and a time of the reset, and then sends a second command to the relevant clients, while each of the relevant clients stops the sound warning and stops displaying the number of the alarm points where the alarm occurs, the identifications of the associated alarm points and the duration of the alarm according to the second command.

12. The security system according to claim 11, wherein each of the user requests is a record for operation on a report, and the request one of the requests for operation on the report includes filter requirements, and the server selects the alarm points where alarm occurs, the time of the alarm, the acknowledged alarm points, the time of acknowledgement, the reset alarm points, and the time of the reset according the filter requirements, and then generates a second report for selected results, and transmits the second report to each of the relevant clients.

* * * * *